Aug. 25, 1931.  F. BRUGUIERE  1,820,366

PADDLE WHEEL PROPELLER

Filed Aug. 4, 1930

INVENTOR.

FAURIE BRUGUIERE.

Patented Aug. 25, 1931

1,820,866

UNITED STATES PATENT OFFICE

FAURIE BRUGUIERE, OF NEW ORLEANS, LOUISIANA

PADDLE WHEEL PROPELLER

Application filed August 4, 1930. Serial No. 472,956.

The invention relates to improvements in paddle wheel propellers.

One of the objects of the invention is to prevent shocks caused by the paddles entering the water.

Another object is to increase efficiency of the wheel by reducing the volume of water lifted by paddles leaving the water.

Another object is to provide a simple and effective power transmission.

Following is a description of a simple form of the invention with reference to drawings illustrating the same:

Figure 2:
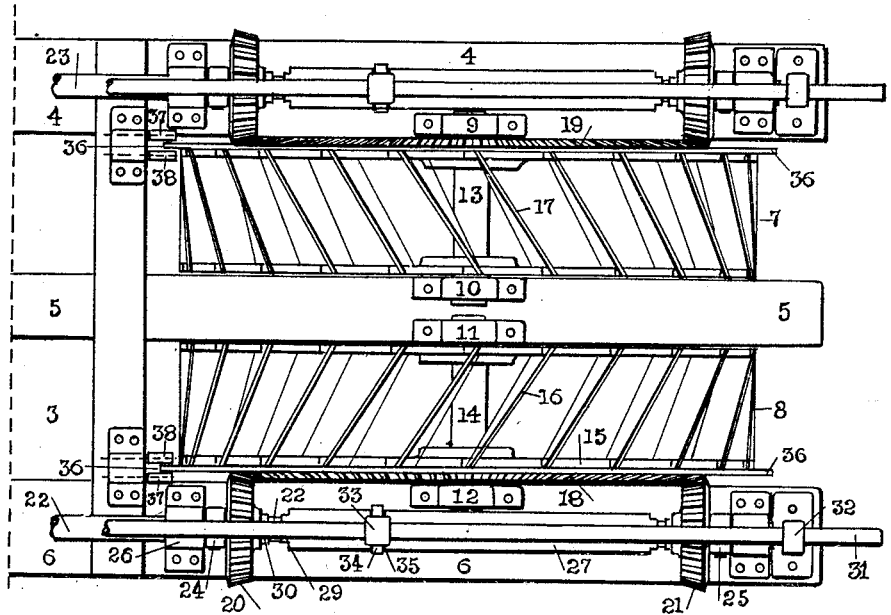
Fig. 2 is a plan view of the same.
Figure 1:
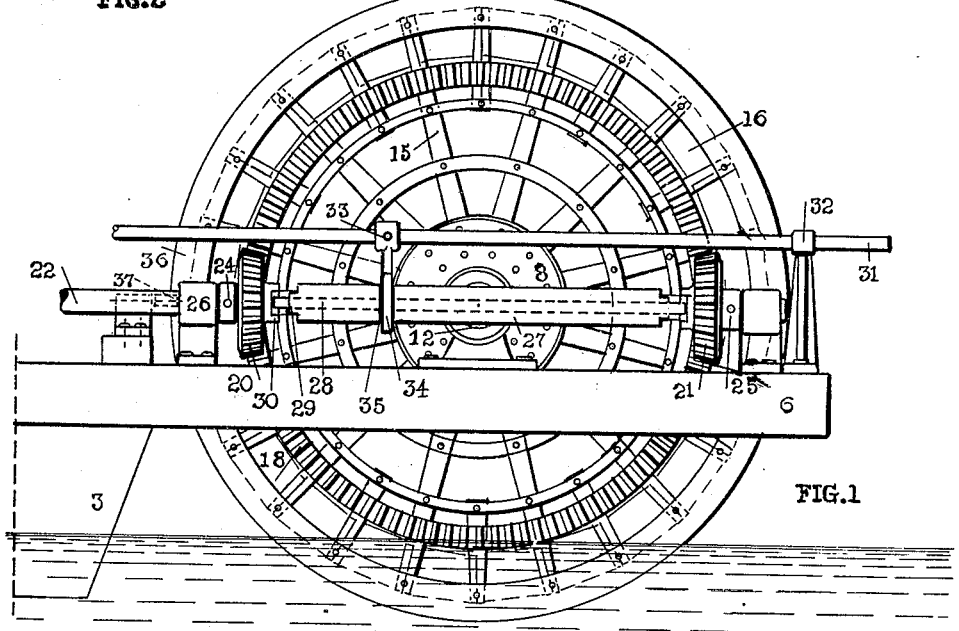
Fig. 1 is a view in elevation of a paddle wheel and part of the transmission means.

3 is the stern of a boat. 4, 5 and 6 are beams abaft providing supports for the paddle wheel and transmission means. 7 and 8 are two paddle wheels mounted respectively in bearings 9 and 10 and 11 and 12, on the shafts 13 and 14. 15 is one of the spokes of the paddle wheels. 16 and 17 show helical paddles with right and left leads respectively. 18 and 19 are bevel gears secured to spokes of the paddle wheels. 20 and 21 are pinions mating with one of the gears aforesaid and independently revoluble on shaft 22. Correspondingly, shaft 23 is also provided with a pair of pinions likewise arranged. 24 and 25 are set collars holding said pinions in mesh. 26 is one of the bearings revolubly supporting the shafts aforesaid. 27 is a clutch member slidably secured by key 28 to one of the shafts aforesaid and provided with jaws 29 and mating with jaws 30, the latter being part of the pinions aforesaid. 31 is a rod slidably mounted in bearings, one of which is shown at 32. 33 is an arm secured to the rod aforesaid and provided with strap 34 fitted to groove 35, the aforesaid clutch member being revoluble in said strap. 36 is a circular band secured to the periphery of the paddle wheel and extending beyond the paddles. 37 and 38 are rollers operating respectively on opposite sides of said circular ring or band, adapted to hold the aforesaid gears in mesh.

Owing to the helical arrangement illustrated, the paddles enter and leave the water gradually, avoiding shocks produced by ordinary propellers when the paddles enter the water, and reducing the volume of water lifted when they leave the water.

The paddle wheel is stationary when the clutch is in the neutral position illustrated. When the clutch-rod 31 is moved forward, engagement of the clutch jaws causes the forward pinions to revolve, when the paddle wheel and boat are moved in a forward direction; and, when the clutch rod 31 is moved backward, the rearward pinions are likewise caused to be revolved, and the paddle wheel and boat are moved in the reverse direction.

Having described one simple form of the invention and its operation, I claim and desire to secure by Letters Patent of the United States, the following combinations and combinations that are equivalent thereto:

1. A paddle wheel including in combination a circular band secured to its outer periphery, extending there-beyond, and a pair of rollers, one of said pair adapted to operate on each side of said band and to secure said wheel against shifting axially.

2. A power actuated boat including in combination a pair of paddle wheels, each provided with a plurality of helically arranged paddles, one with right leads, the other with left leads, a bevel gear secured to each of said paddle wheels, a pair of pinions meshings with each of said gears, one pinion of each pair disposed at circumferentially opposite points of each of said gears, a pair of shafts longitudinal in relation to said boat, each supporting one of said pairs of pinions revoluble independently thereon and means to impart motion from either of said shafts to one of either pair of said pinions.

3. A power actuated boat including in combination a pair of paddle wheels, a bevel gear secured to each of said wheels, a pair of pinions meshing with each of said gears, one pinion of each pair disposed at circumferentially opposite points of each of said gears, a pair of shafts longitudinal in relation to said boat, each supporting one of said pairs of pinions revoluble independently thereon and means to impart motion from either of said shafts to one of either pair of said pinions.

FAURIE BRUGUIERE.